US012644763B2

(12) United States Patent
Reiners et al.

(10) Patent No.: US 12,644,763 B2
(45) Date of Patent: Jun. 2, 2026

(54) METHOD AND GONIORADIOMETER FOR THE DIRECTION-DEPENDENT MEASUREMENT OF AT LEAST ONE LIGHTING OR RADIOMETRIC CHARACTERISTIC VARIABLE OF AN OPTICAL RADIATION SOURCE INSTALLED IN AN OBJECT

(71) Applicant: LMT LICHTMESSTECHNIK GMBH BERLIN, Berlin (DE)

(72) Inventors: Thomas Reiners, Berlin (DE);
Raymund Hammer, Berlin (DE);
Carsten Diem, Berlin (DE)

(73) Assignee: LMT LICHTMESSTECHNIK GMBH BERLIN, Berlin (DE)

( * ) Notice: Subject to any disclaimer, the term of this patent is extended or adjusted under 35 U.S.C. 154(b) by 438 days.

(21) Appl. No.: 18/249,930

(22) PCT Filed: Nov. 24, 2021

(86) PCT No.: PCT/EP2021/082815
§ 371 (c)(1),
(2) Date: Apr. 20, 2023

(87) PCT Pub. No.: WO2022/112324
PCT Pub. Date: Jun. 2, 2022

(65) Prior Publication Data
US 2023/0384150 A1     Nov. 30, 2023

(30) Foreign Application Priority Data
Nov. 30, 2020    (DE) ..................... 10 2020 131 662.3

(51) Int. Cl.
*G01J 1/02*         (2006.01)
*G01J 1/42*         (2006.01)
*G01M 11/06*        (2006.01)

(52) U.S. Cl.
CPC ..... *G01J 1/0242* (2013.01); *G01J 2001/4247* (2013.01); *G01M 11/064* (2013.01)

(58) Field of Classification Search
CPC ........... G01J 1/0242; G01J 2001/4247; H04N 23/90; H04N 23/80; G01M 11/064; G01M 11/0214; G01M 11/065; G01M 11/06

(Continued)

(56) References Cited

U.S. PATENT DOCUMENTS 10,215,622 B2    2/2019  Hammer et al.
2009/0185173 A1*  7/2009  Ashdown ................ G01J 3/504
                                                      356/121

(Continued)

FOREIGN PATENT DOCUMENTS

CN            103954437 A   *  6/2016
DE    10 2009 024 961 A1    12/2010

(Continued)

OTHER PUBLICATIONS

International Search Report, mailed Feb. 18, 2022, from PCT/EP2021/0828215.
Kruger, Udo, "Luminance Measurement Cameras in the Focus of Standardization", LIGHT, Sep. 2019, vol. 6.

(Continued)

*Primary Examiner* — Georgia Y Epps
*Assistant Examiner* — Erin R Garber
(74) *Attorney, Agent, or Firm* — Workman Nydegger

(57)         ABSTRACT
The invention relates to a method and to a gonioradiometer for the direction-dependent measurement of at least one lighting or radiometric characteristic variable of an optical radiation source (2) installed in an object (1). The method comprises: arranging the object (1) on a rotary table (3)

(Continued)

which defines a first coordinate system, wherein the object (1) is arranged on the rotary table (3) such that the radiation concentration point of the optical radiation source (2) is spaced apart from the origin (O) of the first coordinate system; determining the position of the radiation concentration point of the optical radiation source (2) relative to the origin (O) of the first coordinate system (relative position); performing a gonioradiometric measurement which comprises a rotation of the object (1) in the first coordinate system, the object (1) being rotated on the rotary table (3) about the axis of rotation (31) of the rotary table (3); detecting a measurement variable of the radiation source (2) in a direction-dependent manner by means of the gonioradiometric measurement; calculating the measurement variable for the plurality of emission directions in a second coordinate system, the radiation concentration point of the optical radiation source (2) being located in the origin of the coordinate system, based on the direction-dependently detected values of the measurement variable, which have been determined in the first coordinate system, and the relative position, wherein the measurement variable is equal to the characteristic variable to be measured or the characteristic variable to be measured is calculated from the measurement variable.

24 Claims, 6 Drawing Sheets

(58) Field of Classification Search
  USPC ......................................................... 356/121
  See application file for complete search history.

(56) References Cited

U.S. PATENT DOCUMENTS

| | | | |
|---|---|---|---|
| 2013/0214120 A1* | 8/2013 | Shiraiwa | G01J 1/0242 |
| | | | 362/427 |
| 2017/0165848 A1* | 6/2017 | Diem | B25J 19/022 |
| 2018/0003553 A1* | 1/2018 | Hammer | G01J 1/0242 |
| 2022/0018709 A1* | 1/2022 | Trampert | G01M 11/065 |

FOREIGN PATENT DOCUMENTS

| | | |
|---|---|---|
| DE | 10 2013 011 975 A1 | 1/2015 |
| DE | 10 2013 021 958 A1 | 6/2015 |
| DE | 10 2016 116 346 A1 | 3/2018 |
| EP | 3940356 A1 | 1/2022 |
| WO | 2016116300 A1 | 7/2016 |

OTHER PUBLICATIONS

International Commission on Illumination, "The Measurement of Absolute Luminous Intensity Distributions", Central Bureau of the CIE, 1987, Pub. No. 70, Austria.

Jacobs, V. et al: "Analyses of Errors Associated With Photometric Distance in Goniophotometry", Proceedings of 28th CIE Session, Dec. 31, 2015, 11 pages.

"C-NCAP Administrative Rules" (2021 edition) May 15, 2020, (exposure draft) A p p e n d i x D, Vehicle Lighting Performance Test, China Automotive Technology and Research Center Ltd., 19 pages.

Chinese First Office Action, mailed Apr. 10, 2024, from Chinese Serial No. 202180080520.6, 26 pages.

International Preliminary Report on Patentability and Written Opinion, mailed May 30, 2023, from PCT/EP2021/082815.

* cited by examiner

METHOD AND GONIORADIOMETER FOR THE DIRECTION-DEPENDENT MEASUREMENT OF AT LEAST ONE LIGHTING OR RADIOMETRIC CHARACTERISTIC VARIABLE OF AN OPTICAL RADIATION SOURCE INSTALLED IN AN OBJECT

BACKGROUND

The invention relates to a method and a gonioradiometer for the direction-dependent measurement of at least one lighting or radiometric characteristic quantity of an optical radiation source installed in an object.

For the measurement of lighting or radiometric characteristic quantities of lamps and lights, gonioradiometers are conventionally used. These are mechanical-optical measuring systems with which the direction dependency of quantities for describing optical radiation may be determined. For example, depending on the sensor or measuring equipment head used, the luminous intensity distribution or the color distribution body of a light source may be determined. The light or radiation source is arranged with its light centroid at the center of the gonioradiometer and at the coordinate origin of a spherical coordinate system. Measurement values of a lighting or radiometric characteristic quantity may for this case be measured goniometrically, that is to say for all directions, by rotating the light or radiation source or by moving the sensor successively into different angle ranges.

By evaluating individual directions and/or by integrating the measurement results over subranges or the entire solid angle of a distribution body, the lighting or radiometric characteristic quantities for the source are obtained.

A lighting or radiometric characteristic quantity, for example the luminous intensity, is a direction-dependent quantity, the emission direction of which may generally be specified by two angles in a spherical coordinate system associated with the light source. Description by particular systems of planes, which are referred to as A-planes, B-planes and C-planes, has become widespread. These planes are described in the document CIE No 70 (1987): "The measurement of absolute luminous intensity distributions", Central Bureau of the CIE, ISBN 3 900 734 05 4, the content of which is incorporated by reference.

Particular gonioradiometer types, which are likewise defined in the document CIE No 70 (1987), have proven successful in practice. In type 1.1 to 1.3 gonioradiometers, the light source is rotated during a measurement while the sensor is stably positioned. In type 3 gonioradiometers, the radiation source is rotated about an axis and a sensor is displaced along a straight line which extends parallel to the rotation axis. In this case, the light source or radiation source is placed with its light centroid, or radiation centroid, at the center of the gonioradiometer.

There is an increasing interest in the recording of lighting or radiometric characteristic quantities of lamps and lights in the state in which they are encountered during their use, that is to say in their installed state. One important application is in this case measurement of the quality of the headlamp illumination and/or lighting signal functions of a vehicle in the installed state. Such testing differs from conventional tests on lighting components of vehicles (headlamps, lights) insofar as influences and tolerances which are due to the installation of these components on the vehicle are also recorded. These influences are above all due to the deviation from the intended installation position, for example by tolerances entailed in the body manufacture;

the deviation of the vehicle from the horizontal, for example caused by tolerances of the chassis, in particular the insertion depths of springs, by loading (number of passengers, fuel, that is to say full or empty tank) or the influence of the air pressure in the tires; and quality of the headlamp adjustment at the end of the vehicle manufacture.

The object of the present invention is to provide a method and a gonioradiometer for the direction-dependent measurement of at least one lighting or radiometric characteristic quantity of an optical radiation source, which allows the characteristic quantity of the radiation source to be recorded in the installed state of the radiation source.

SUMMARY

A first aspect of the invention relates to a method for the direction-dependent measurement of at least one lighting or radiometric characteristic quantity of an optical radiation source installed in an object, the method comprising the following steps (which need not necessarily be carried out in the order specified).

The object is arranged on a turntable which has a rotation axis, the rotation axis of the turntable defining a first coordinate system, the origin of which is formed for example by the point of intersection of the surface of the turntable with the rotation axis and the spatial axis of which coincides with the rotation axis. The object is in this case arranged on the turntable in such a way that the radiation centroid of the optical radiation source is spaced apart from the origin of the first coordinate system. If the object is for example a vehicle, the vehicle is therefore placed entirely on the turntable, the radiation centroid of the headlamp not lying on the axis of the turntable.

A gonioradiometric measurement which comprises rotation of the object about an axis is carried out, the gonioradiometric measurement being carried out in the first coordinate system and the object on the turntable being rotated starting from an initial position about the rotation axis of the turntable, and the rotation axis of the turntable constituting the axis of the gonioradiometric measurement. In this case, the rotation axis of the turntable may extend in a vertical direction, although this is not compulsory.

During the gonioradiometric measurement, direction-dependent recording of a measurement quantity of the radiation source is carried out for a multiplicity of emission directions, or measurement angles, emission directions which are defined in the first coordinate system respectively being assigned measured values of the measurement quantity. For example, each emission direction defined in the first coordinate system is respectively assigned a value of the measurement quantity recorded by a sensor. The gonioradiometric measurement is in this case carried out in the first coordinate system.

Furthermore, the position of the radiation centroid of the optical radiation source is determined, for example in the initial position, relative to the origin of the first coordinate system. This may be done before the gonioradiometric measurement begins. It is now intended that the measurement quantity be calculated for the multiplicity of emission directions in a second coordinate system, in which the radiation centroid of the optical radiation source lies at the origin of the coordinate system. This is carried out on the basis of the measurement values of the measurement quantity which are recorded direction-dependently in the first coordinate system and the relative position (that is to say the position of the radiation centroid of the optical radiation source relative to the origin of the first coordinate system). The spatial distribution of the measurement quantity is therefore converted from the distribution measured in the first coordinate system into a spatial distribution for which the radiation centroid of the optical radiation source lies at the center.

The measurement quantity may already be the characteristic quantity to be measured, or the characteristic quantity to be measured is calculated from the measurement quantity. If the measurement quantity is the illuminance measured by a sensor, for example, the luminous intensity of the radiation source as the characteristic quantity to be measured may be derived therefrom. This is carried out by means of a correction in respect of the range and the angle of incidence with respect to the sensor, according to the configuration as claimed in claim 9.

By the method carried out, it is possible to provide information relating to the spatial distribution of the characteristic quantity for the radiation source even though the latter is not located at the origin of the coordinate system in which the gonioradiometric measurement takes place.

Aspects of the invention are therefore based on the concept of not positioning the characteristic quantity to be recorded, or the function to be tested, at the center of the axes of the gonioradiometer, but initially performing a gonioradiometric measurement with acentric positioning of the radiation source. Through knowledge of the acentric placement of the radiation source on the turntable, the respective measurement angle may then be calculated in the system of the test object, or of the radiation source. The conversion is carried out on the basis of a coordinate transformation between the respective coordinate systems.

In other words, the aspects of the invention propose that the light distribution, or characteristic quantity distribution, of the radiation source be determined by means of two coupled coordinate systems. The movement takes place in a first coordinate system, while the light distribution, or the distribution of the characteristic quantity to be measured, is calculated in a second coordinate system.

The selection of the two coupled coordinate systems is in this case such that the relationships between the angles (D/S) of the first coordinate system and the angles (H/V) of the second coordinate system are bijective, that is to say there is biunique mathematical calculation function for transforming from one coordinate system into the other, and there is also a unique inverse function for transforming from the second coordinate system back into the first.

Aspects of the invention are associated with the advantage that the characteristic quantity to be measured of the radiation source in the installed state can be direction-dependently recorded and quantitatively evaluated exactly, even though the radiation source does not lie at the origin of the radiometric measurement. This allows measurements which also take into account influences and tolerances that are due to the installation of the radiation source in an object, for example in a vehicle.

As already mentioned, according to one configuration of the invention the object observed is an automobile, or a vehicle. It is placed entirely on the turntable. Different installed radiation sources may in this case be measured successively, for example the left headlamp light, the right headlamp light as well as signal lamps, for example turn signal lights. Naturally, the headlamp lights may be measured in different operating modes such as low beam, high beam and parking light. The invention may, however, also be carried out on spatially extended modules which are arranged on the turntable and contain an acentrically mounted radiation source.

According to one configuration of the invention, the rotation axis of the turntable extends in the vertical direction. This is recommendable for the simple reason of being able to distribute the weight of the object uniformly on the turntable. In principle, however, it is likewise conceivable for the turntable to be oriented with a certain obliquity in space so that its rotation axis extends at an angle with respect to the vertical direction.

Naturally, it is not possible to record the characteristic quantity for every emission direction since there are infinitely many emission directions. Instead, a particular grid of emission directions is recorded, each of which represents a particular solid angle, that is to say a particular fraction of the total solid angle. In order to define emission directions according to such a grid, it is sufficient for the turntable to be rotated incrementally, rotational settings which the turntable occupies respectively corresponding to an emission direction. Alternatively, the turntable is rotated continuously, measurement values which then respectively correspond to a particular emission direction being recorded at particular instants, or at defined angles.

According to one configuration of the invention, in addition to the rotation of the object on the turntable, the gonioradiometric measurement comprises recording of the characteristic quantity along a straight line as a function of the position along this line. In this configuration, the gonioradiometer is a type 3 gonioradiometer, the radiation source being rotated (on the turntable and acentrically thereon) about an axis and a sensor being displaced along a straight line.

Thus, according to one configuration, for this purpose a sensor which is displaced along the straight line, and which acquires measurement values of the emitted radiation for defined positions on the line, is used for the gonioradiometric measurement. The sensor is in this case preferably displaced on a vertical line which extends parallel to the rotation axis of the turntable, so that the recording of the measurement quantity takes place along a vertically extending line, as a result of which, in combination with the rotation, an orthogonal grid is encompassed. In principle, the sensor can however be displaced on a line which extends arbitrarily in space. Alternatively, instead of one sensor, it is possible to provide a multiplicity of sensors which are arranged along the straight line, so that displacement of a sensor is not necessary.

The selection of this type 3 goniometer has the advantage that the object, or vehicle, does not need to be tilted about a horizontal axis. In the event of such tilting, forces in the vehicle suspension, which in turn influence the design-related orientation of the vehicle from the imaginary horizontal, would be generated by gravity. In order to be able to measure a lighting function in the installed state on the vehicle with such a type of goniometer conventionally, that is to say without the use of two coupled coordinate systems, the light source to be measured (low beam, turn signaling, etc.) would need to be put at the center of the rotation axis, and after it has been securely fitted in the vehicle, the entire vehicle would need to be moved laterally and then fixed again. Besides the mechanical challenges, this in turn would also entail a much greater spatial requirement so that the laboratory dimensions would need to be much larger.

According to this aspect of the invention, without compromising the accuracy, the present invention therefore proposes to position the vehicle arbitrarily on a rotating device and subsequently to precisely measure the position of the light function to be measured in relation to the rotation axis.

The plane of the turntable on which the object, or vehicle, is located represents the plane of the roadway and all lighting measurement quantities are related to this plane in the further evaluation, so as to ascertain the illumination situation produced by the vehicle on the roadway.

According to one alternative embodiment, the illuminance is measured as the measurement quantity and the luminous intensity as the characteristic quantity to be measured of the radiation source is calculated from the illuminance with the following formula:

$$I = \frac{E \cdot d^2}{\cos H \cdot \cos V}$$

where

I is the luminous intensity,

E is the measured illuminance, d is the distance between the light source and the sensor and (H,V) are the angles at which a sensor oriented rigidly parallel to the X axis has been illuminated, that is to say H corresponds to the azimuth angle φ, and V corresponds to 90° minus the polar angle θ, in the conventional notation of spherical coordinates.

In order to calculate the luminous intensity from the measured illuminance, for example, the range d between the light source and the sensor as well as the angles H and V must therefore be known. The formula assumes that the sensor is oriented parallel to the X axis (H=0). This distance correction takes into account the fact that the sensor surface of the sensor, or photometer, receives a reduced intensity of light under oblique light incidence, as well as the range between the radiation source and the sensor.

According to one alternative embodiment, for this purpose, in addition to the rotation of the object on the turntable and the recording of the characteristic quantity along a straight line as a function of the position along this line, the gonioradiometric measurement comprises recording of the characteristic quantity along a second straight line as a function of the position along this second line, the first line and the second line extending parallel and being arranged at a different distance from the origin of the first coordinate system. The two lines, or linear axes, are in this case preferably arranged at different ranges, for example without restriction of generality at 25 m and 5 m. With such an arrangement, not only headlamps but also signal functions may be measured optimally in a setting on the vehicle.

It should be pointed out that the radiation centroid of a radiation source may in principle be defined in different ways. For example, it may be the midpoint of a coiled filament which emits light. Another possibility is to define the radiation centroid of the radiation source as the geometrical centroid of a radiation beam which passes through a closure plate that delimits the radiation source from the surroundings. The closure plate is for example the headlamp lens from which the light beam emerges. It is in this case conventional for a radiation centroid defined in this way to be denoted by a marking in the closure plate on the part of the manufacturer.

According to another configuration of the invention, the calculation of the direction-dependent characteristic quantity in the second coordinate system from the direction-dependently recorded values of the measurement quantity in the first coordinate system is carried out by mapping the coordinates of the measurement values recorded in the first coordinate system onto corresponding coordinates in the second coordinate system. In principle, any desired coordinate systems may be used in this case, for example cartesian, cylindrical and spherical coordinate systems. For example, in a spherical coordinate system each emission direction is defined by an azimuth angle and a polar angle.

According to an alternative embodiment having a rotary table and a linear axis, the first coordinate system is a cylindrical coordinate system, and the coordinates of the values recorded in the first coordinate system are converted in a first step to a further cylindrical coordinate system, at the origin of which the radiation centroid of the radiation source lies, and are converted in a second step to a spherical coordinate system, at the origin of which the radiation centroid of the radiation source lies, the spherical coordinate system being the second coordinate system. The conversion into a spherical coordinate system with the radiation centroid of the radiation source at the origin is therefore carried out with an intermediate calculation of the coordinates in an intermediate coordinate system. This is however merely one exemplary embodiment. In principle, a direct conversion may also be carried out between the first coordinate system and the second coordinate system. Any suitable mathematical methods may be used in this case.

According to the alternative embodiment described above, for each emission direction, the position of the sensor in the first coordinate system is calculated on the one hand from the rotation angle D of the rotary plate and on the other hand from the height S of the sensor, and the azimuth angle H and an elevation angle V of the sensor position in the second coordinate system are calculated therefrom, and the value of the measurement quantity measured by the sensor in question is assigned to this emission direction defined by azimuth angle and elevation angle. In addition, the respective measurement value is in this case corrected by the range and the angle of incidence with respect to the sensor in order to obtain the characteristic quantity from the measurement quantity, particularly in order to calculate the luminous intensity from the illuminance.

According to another configuration, the gonioradiometric measurement is carried out not according to type 3 but instead by using a camera. In this case, in addition to the rotation of the object on the turntable, the gonioradiometric measurement comprises recording of the measurement quantity by means of a statically arranged camera, the radiation emitted by the radiation source being reflected at a reflective measurement wall with diffuse, nondirectional reflection and being recorded by the camera as a luminance distribution on the measurement wall for at least two settings of the turntable. The luminance distribution recorded by the camera is in this case converted with the aid of a coordinate transformation into a luminance distribution in the second coordinate system. The luminance distribution in this case constitutes the measurement quantity.

Such measuring arrangement is essentially based on a gonioradiometric measuring arrangement such as is described in WO 2016/116300 A1, the content of which is incorporated by reference.

According to this alternative embodiment, only the rotational movement of the vehicle and the camera-measurement wall measuring system are needed for the gonioradiometric measurement in order to be able to record full angle ranges in a single luminance image. The luminance distribution measured on the wall by the camera is subsequently converted into the luminous intensity distribution of the headlamp with the aid of a coordinate transformation.

The luminance distribution represented on the measurement wall in a setting of the object on the turntable in this case already defines a relatively large solid angle, that is to say 2-dimensional measurement values for a multiplicity of emission directions are recorded by the objective of the camera in the solid angle defined by the measurement wall. If the measurement wall is high enough to image the vertical distribution of the radiation source fully in the far field, the polar angle dependency of the characteristic quantity to be measured may already be determined by means of a representation, or luminance distribution, on the measurement wall. Other solid angles with other azimuth angles are represented on the measurement wall by rotating the turntable. Depending on the width of the measurement wall, the luminance distribution is recorded for at least two settings of the turntable (otherwise there would be no gonioradiometric measurement), the overall light distribution being composed of a concatenation of the individual solid angle grids.

Coupled coordinate systems are also used in the alternative embodiment with a camera, that is to say the transformation of the wall coordinates, in which the luminance camera ascertains the measurement values, into the spherical coordinates in the reference system of the headlamp varies with the rotation of the headlamp in space. If the coordinates of the headlamp are known as a function of the angle of the rotating device, it is again possible to find a bijective mapping with which the light distribution in the reference system of the test object may be calculated from the angle of the rotating device and the height of the headlamp.

A plurality of partial angle ranges may then be combined to form the overall angle distribution. The advantage of such a method is that the data are obtained more rapidly with a combination of vehicle rotation and camera measurement than is possible with the sequential grid measurement based on a sensor, or photometer, and at the same time no requirements need to be demanded of the position of the headlamp on the rotary plate—it merely needs to be determined precisely.

According to one configuration, the measurement wall is arranged in the far field of the light distribution of the radiation source, that is to say at a range at which the radiation source may be regarded approximately as a point light source. For example, the measurement wall is at a range of 25 m away from the radiation source in its initial position.

According to another configuration, the light of the radiation source additionally illuminates a further sensor directly and the signal recorded by this sensor is used for a calibration of the camera. Since the measurement uncertainty of a camera measurement is significantly greater than that of a sensor measurement (typically by means of a photometer), the data obtained with the camera may be corrected pointwise by means of the sensor. The further sensor may be a sensor which is arranged in front of or laterally next to the measurement wall. It is furthermore possible for the sensor to be arranged behind the measurement wall and irradiated through an opening in the measurement wall.

The advantage of a correction by using a further sensor, besides the reduction of the measurement uncertainty, is also that the traceability of the measurement values is carried out by the sensor, or the photometer, and that the measurement wall-camera combination does not need to be calibrated absolutely.

According to another configuration of the invention, in addition to the rotation of the object on the turntable, the gonioradiometric measurement involves tilting of the turntable or object about an axis perpendicular to the rotation axis, the object being rotated on the turntable for a multiplicity of inclination angles and the measurement quantity being recorded for each combination of rotation angle and inclination angle, the measurement quantity being recorded on the basis of the gonioradiometric measurement on a spherical surface around the radiation centroid of the radiation source. In particular, the object is additionally tilted about the horizontal axis (by tilting the turntable or tilting the object). A static sensor, which acquires a measurement value of the emitted radiation for each combination of rotation angle and inclination angle, may in this case be used for the gonioradiometric measurement.

The angle through which the turntable, or the object, is tilted is in this case recorded by means of a suitable measuring system, either the tilt angle of the turntable or the tilt angle of the bodywork (if the object in which the radiation source is installed is a vehicle) being recorded.

Such an arrangement has the advantage that, for a gonioradiometric measurement, it is not necessary to displace a sensor on a linear axis in order to measure the elevation angle in the coupled coordinate system, but instead this may be done by inclining the vehicle forward or backward. In this way, the photometer may be configured to be stationary, which is advantageous for example when the ceiling height is limited. In this alternative embodiment, however, it is necessary to record and correct the disadvantages mentioned in the introduction of a vehicle inclination on the chassis. This may for example be done using cameras fitted on the left and right of the vehicle, which measure marking points applied on the bodywork and therefore record the real tilt angle of the vehicle in relation to the horizontal neutral position, without chassis influences such as spring compression or air pressure of the tires being capable of vitiating the vertical angle.

In this exemplary embodiment, the measurement is carried out by rotation of the platform on which the inclined vehicle is set up, in combination with the tilting, so that the headlamp moves on a circle arc inclined by the tilt angle around the midpoint of the rotating device. However, the measurement geometry is now described by coupling of a spherical coordinate system with an origin on a spherical surface.

According to one alternative embodiment, for this purpose the calculation of the direction-dependent measurement quantity in the second coordinate system from the direction-dependently recorded values of the measurement quantity in the first coordinate system is carried out by mapping the coordinates of the values recorded in the first coordinate system onto corresponding coordinates in the second coordinate system, the second coordinate system being a spherical coordinate system, the origin of which moves on a spherical surface.

According to a second aspect of the invention, a method for the direction-dependent measurement of at least one lighting or radiometric characteristic quantity of an optical radiation source installed in an object is provided, the method comprising the steps:

arranging the object at or on a holding element, which is intended and configured to rotate the object about a first axis and about a second axis which is perpendicular to the first axis, the object being arranged on the holding element in such a way that the radiation centroid of the optical radiation source lies outside the origin of a first coordinate system formed by the first axis and the second axis, determining the position of the radiation centroid of the optical radiation source relative to the origin of the first coordinate system (relative position), performing a gonioradiometric measurement which comprises rotation of the object about the two axes, the gonioradiometric measurement being carried out in the first coordinate system, direction-dependently recording a measurement quantity of the radiation source by means of the gonioradiometric measurement for a multiplicity of emission directions, emission directions which are defined in the first coordinate system respectively being assigned measured values of the measurement quantity, calculating the direction-dependent measurement quantity for the multiplicity of emission directions in a second coordinate system, in which the radiation centroid of the optical radiation source lies at the coordinate origin, from the direction-dependently recorded values of the measurement quantity which have been ascertained in the first coordinate system and the relative position, wherein the measurement quantity is the same as the characteristic quantity to be measured or the characteristic quantity to be measured is calculated from the measurement quantity.

This method differs from the method as claimed in claim 1 in that the object is not arranged on a turntable, but instead is rotated about two axes in accordance with a conventional gonioradiometric measurement with a type 1 gonioradiometer, although here the radiation centroid of the radiation source is also located outside the origin of the coordinate system in which the measurement takes place, and a conversion into the second coordinate system is subsequently carried out. The object is in this case arranged arbitrarily in space and is for example held by a robot, as a holding element, which can rotate the object about a plurality of axes.

A further aspect of the present invention relates to a gonioradiometer for the direction-dependent measurement of at least one lighting or radiometric characteristic quantity of an optical radiation source installed in an object, wherein the gonioradiometer comprises:

a turntable which has a rotation axis, the rotation axis of the turntable defining a first coordinate system, the origin of which is formed by the point of intersection of the surface of the turntable with the rotation axis and the spatial axis of which coincides with the rotation axis, and the turntable being intended to receive the object in such a way that the radiation centroid of the optical radiation source is spaced apart from the origin of the first coordinate system, at least one sensor which is configured and intended to measure a measurement quantity, wherein the turntable and the at least one sensor are configured to carry out a gonioradiometric measurement, which comprises rotation of the object about the rotation axis of the turntable, in the first coordinate system, the measurement quantity being recorded by means of the gonioradiometric measurement for a multiplicity of emission directions, emission directions which are defined in the first coordinate system respectively being assigned measured values of the measurement quantity, a calculation unit for calculating the measurement quantity for the multiplicity of emission directions in a second coordinate system, in which the radiation centroid of the optical radiation source lies at the origin of the coordinate system, from the position of the radiation centroid of the optical radiation source relative to the origin of the first coordinate system and from the direction-dependently recorded values of the measurement quantity which have been ascertained in the first coordinate system, the calculation unit furthermore being configured to calculate the characteristic quantity to be measured from the measurement quantity, if the measurement quantity is not already the characteristic quantity to be measured.

With such a gonioradiometer, it is possible to carry out a method as claimed in claim 1. In particular, the gonioradiometer may form a type 3 gonioradiometer, the at least one sensor recording the measurement quantity along a straight line as a function of the height position along this line.

With the gonioradiometer, in particular the quality of the headlamp illumination or of the lighting signal functions of a vehicle may be assessed in the installed state. Such testing differs from the conventional tests on lighting components of vehicles (headlamps, lights) insofar as influences and tolerances which are due to the installation of these components on the vehicle are also recorded.

In some configurations of the invention, the gonioradiometer is intended and configured to carry out the method variants specified in claims 2-18.

According to one alternative embodiment, the gonioradiometer furthermore comprises:

a reflective measurement wall with diffuse reflection, which reflects the light emitted by the radiation source, a camera arranged statically and immovably and having a 2-dimensional sensor chip, the pixels of the sensor chip forming the at least one sensor, the camera being arranged and configured in such a way that it records light reflected at the measurement wall for at least two settings of the turntable, the reflected light being imaged onto the sensor chip of the camera and the reflected light being recorded by the camera as a luminance distribution on the measurement wall, the calculation unit being configured to convert the distribution of the luminance, recorded by the camera, into a luminance distribution in the second coordinate system by means of a coordinate transformation.

According to another alternative embodiment, the at least one sensor comprises a static sensor, in addition to rotation about the rotation axis, the turntable is configured to tilt an object arranged on it about an axis perpendicular to the rotation axis, or the object is arranged tiltably about such an axis, the turntable, or the object, and the at least one sensor cooperating during a gonioradiometric measurement in such a way that the object is rotated on the turntable during the gonioradiometric measurement for a multiplicity of inclination angles and the static sensor recording the characteristic quantity to be measured for each combination of rotation angle and inclination angle.

It should be pointed out that the terms mentioned below are defined as follows in the scope of the present disclosure.

The terms lighting and photometric may also include the term radiometric, insofar as infrared (IR) or ultraviolet (UV) characteristic quantities are measured.

The term sensor includes all embodiments for the measurement of optical radiation (ultraviolet, visible light and infrared) in the wavelength range of from 100 nm (UV-C) to 1 mm (IR-C). According to one exemplary embodiment, the sensor is configured as a photometer.

The terms goniophotometer and gonioradiometer are used synonymously when the light distribution of a lighting instrument is being recorded with any sensor (photometric or radiometric). When gonioradiometers are referred to, this always means all embodiments, regardless of which sensor is employed.

The term vehicles may include vehicles of any type, in particular for traffic on roads, on rails, in water or in the air. The exemplary embodiments below generally relate to road vehicles for the individual transport of persons (automobiles).

The term lighting instruments may, besides headlamps for illuminating the roadway or signal instruments of vehicles, also include lighting instruments of thoroughfares.

BRIEF DESCRIPTION OF THE DRAWINGS

Aspects of the invention will be explained in more detail on the basis of a plurality of exemplary embodiments, with reference being made to the figures, in which.

DETAILED DESCRIPTION

Figure 10:
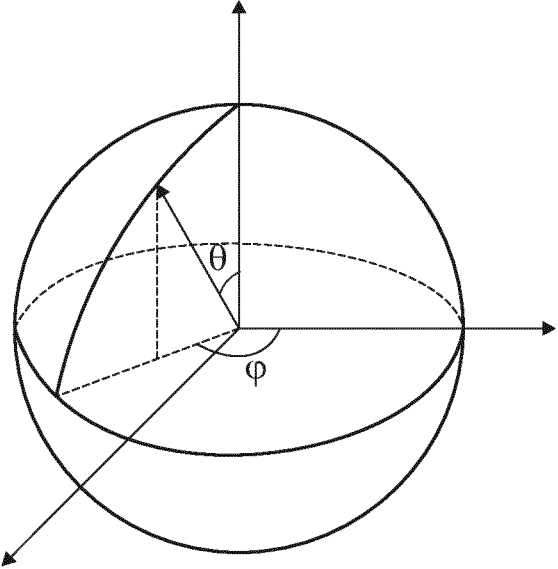
FIG. 10 shows the representation of a spherical coordinate system.

Regarding the general background of the invention, reference is first made to FIG. 10. FIG. 10 represents a spherical coordinate system with a representation of the definition of the angles phi $\varphi$ and theta $\theta$. If there is a radiation source at the origin of such a spherical coordinate system, lighting or radiometric characteristic quantities of the radiation source could be measured goniometrically, that is to say for all directions, by rotation of the radiation source or by movement of a sensor successively in the angle ranges $-180°\leq\varphi\leq180°$ and $0\leq\theta\leq180°$. An emission direction may therefore be defined by two angles $\varphi$, $\theta$.

In general, it is the case that a multiplicity i of emission directions, or angle pairs $\varphi_i$, $\theta_i$, are respectively assigned a particular luminous intensity or other lighting or radiometric characteristic quantities of a radiation source, which are measured on a spherical surface or a subregion of a spherical surface by means of a sensor or which are derived from a measurement value recorded by the sensor, by a gonioradiometric measurement. In this way, a spatial distribution of the luminous intensity or of the measured characteristic quantity, which defines the radiation source, is determined. Precise determination of the spatial distribution or precise compliance with predetermined spatial values of the characteristic quantity in question is of extreme importance, for example for headlamps of vehicles.

For the measurement of headlamps of vehicles, the headlamps (left and right, respectively) may initially be measured separately as individual objects with a conventional gonioradiometer and the light distributions of the individual headlamps may then be superimposed in order to simulate the light distribution on the roadway. Such a component measurement with a goniometer neglects many factors and, in particular, does not take the installation state on the vehicle into account.

Figure 1:
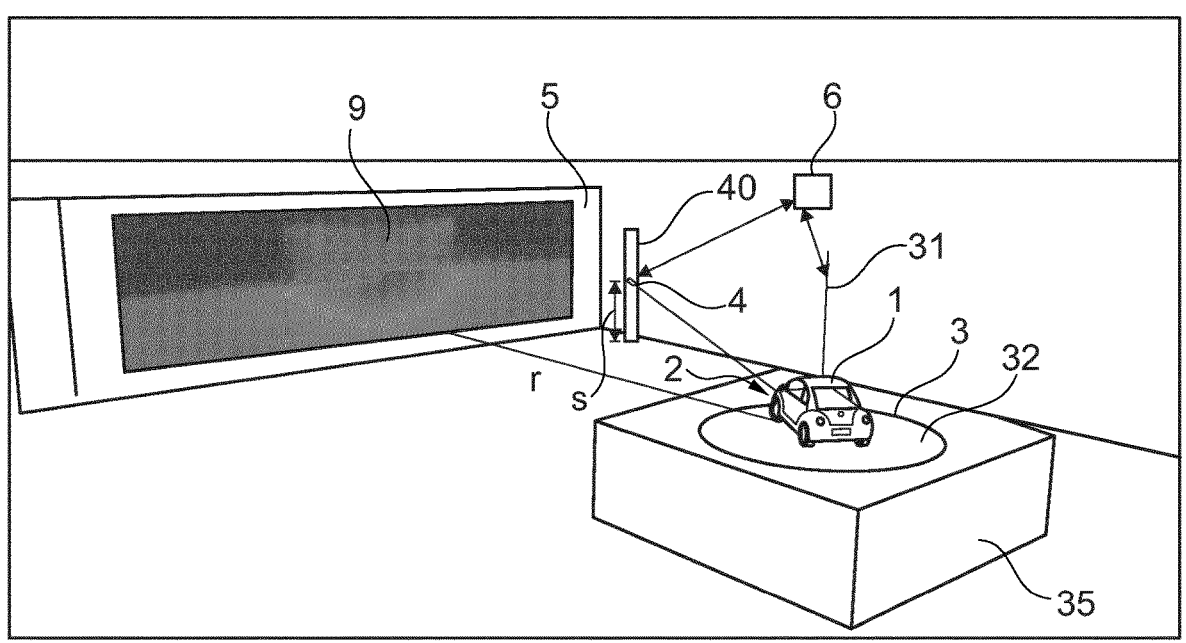
FIG. 1 shows the basic structure of a gonioradiometer in which, for a gonioradiometric measurement, an object which is arranged on a rotary plate and in which a radiation source is installed acentrically is rotated and a sensor is displaced vertically along a mast.

FIG. 1 shows a first exemplary embodiment of a gonioradiometer. The gonioradiometer comprises a turntable 3, which can be rotated about a rotation axis 31. The turntable 3 is located on a platform 35. This, however, is only intended to be understood as an example. Alternatively, it is possible to provide other measures which make it possible that an angle range emitting downward from the plane of the turntable 3 can be photometrically recorded, for example arrangement of the turntable 3 on a higher intermediate floor level.

At least in the region of the vehicle, the turntable 3 has a planar surface 32 which, together with the rotation axis 31, defines a first coordinate system, the origin of which is formed by the point of intersection of the surface 32 of the turntable 3 with the rotation axis 31 and the spatial axis (z axis) of which coincides with the rotation axis 31. The rotation axis 31 in this case extends vertically.

Arranged on the turntable there is a vehicle 1, which in the conventional way has two front headlamps 2, each of which is to be measured gonioradiometrically in respect of a lighting or radiometric characteristic quantity. The vehicle 1 is in this case arranged substantially centrally on the turntable 3, so that the headlamps 2 are spaced apart from the origin of the first coordinate system, which is formed as explained above, and from the rotation axis 31.

In order to perform a gonioradiometric measurement, a vertically extending mast 40 on which a sensor 4 can be displaced vertically between different height positions S is furthermore provided. The mast 40 extends starting from the floor plane, which lies at a lower level than the plane of the turntable 3 so that radiation emitted downward by the front headlamp 2 can also be recorded.

Furthermore represented is a measurement wall 5, which diffusely reflects the emitted headlamp light. In the exemplary embodiment in question, the measurement wall 5 is not relevant in respect of the gonioradiometric measurement to be carried out, although it may be used for visualization of the headlamp orientation and for visual checking of the illumination distribution generated by the headlamp. The shortest distance between the rotation axis 31 and the measurement wall 5 is denoted by r.

Both the mast 40 with the sensor 4 and the measurement wall 5 are located in the far field of the headlamps of the vehicle 1, a distance of 25 m being for example selected as the distance.

The gonioradiometer provided by the structure represented is a type 3 gonioradiometer, in which a rotation about a rotation axis, here the rotation axis 31 of the turntable 3, is combined with the displacement of a sensor, here the sensor 4, along a straight vertical line. The measurement is in this case carried out by the sensor 4 being displaced vertically for a particular rotation angle setting of the turntable 3, while acquiring a multiplicity of measurement values which correspond to different height positions S. This is repeated for a multiplicity of rotation angle settings of the turntable 3. Alternatively, the turntable 3 is displaced into different turntable settings at a given height position S of the sensor 4, and this is repeated for different height positions S.

During a measurement, only one radiation source is active at a time, in the exemplary embodiment represented the left headlamp.

The sensors 4 may in principle be any sensors which are suitable for measuring optical radiation in the wavelength range of from 100 nm to 1 μm, or in a subrange of this wavelength range. For example, they are photometers. Provision may be made for the sensors 1 to perform partial or full filtering by which the sensitivity of the sensor is assimilated to the sensitivity curve of a normal eye. For example, the sensors 4 deliver brightness values as output values.

The sensor 4 is displaced along the mast 40 for example into height positions S which have a vertical distance from one another that corresponds to an angular dimension of 0.05°, 0.1°, 0.15° or 0.2°. This, however, is only intended to be understood as an example.

During a gonioradiometric measurement carried out in this way, however, the procedure is such that the direction-dependent recording of the characteristic quantity to be measured of the radiation source (the headlamp) takes place for a multiplicity of emission directions in the first coordinate system. The spatial distribution, ascertained by the measurement, of the illuminance or of another characteristic quantity does not therefore provide information relating to the spatial distribution of the characteristic quantity in question for the radiation source.

In order to ascertain the spatial distribution of the characteristic quantity in question for the radiation source, the characteristic quantity in question is converted, while taking into account on the one hand the position of the radiation centroid of the optical radiation source relative to the origin of the first coordinate system and while taking into account on the other hand the values of the characteristic quantity which are recorded direction-dependently in the first coordinate system, into a second coordinate system in which the radiation centroid of the optical radiation source lies at the origin of the coordinate system.

It should be pointed out that, for the sake of simplicity, the terms "measurement quantity" and "characteristic quantity" are used synonymously in the following description of the figures. In this case, the measurement quantity is the measurement value measured by a sensor. The characteristic quantity may be the same as the measurement quantity, or may be derived from the measurement quantity. If the measurement quantity is the illuminance, for example, the luminous intensity is calculated as a characteristic quantity of the radiation source from the illuminance by means of a distance correction which takes into account the fact that the sensor surface of the sensor, or photometer, receives a reduced intensity of light under oblique light incidence, which furthermore takes into account the range between the radiation source and the sensor.

The precise determination of the position of the radiation centroid of the optical radiation source relative to the origin of the first coordinate system may, for example, be carried out by means of a tactile measuring system which samples particular markings on the vehicle and calculates relative positions therefrom. Such a tactile measuring system is, for example, produced and marketed by the company Hexagon Metrology under the name "ROMER ABSOLUTE ARM". It should additionally be mentioned here that the radiation centroid of a headlamp installed in a vehicle is typically already indicated on the part of the manufacturer by a marking which is integrated into the closure plate of the headlamp and indicates the geometrical centroid of a radiation beam which emerges through the closure plate. For example, the precise position of the radiation centroid relative to the origin of the first coordinate system may in this way be recorded exactly.

The conversion of the characteristic quantity for the multiplicity of emission directions into corresponding values in the second coordinate system is carried out by a mapping, or coordinate transformation. In this regard, with the aid of FIGS. 2-5, an alternative embodiment will be described below in which such a coordinate transformation is carried out by recording the recorded values in the first coordinate system as cylindrical coordinates, converting the recorded values in a first step to a further cylindrical coordinate system, at the origin of which the radiation centroid of the radiation source lies, and converting them in a second step, while taking the range into account, into a spherical coordinate system, at the origin of which the radiation centroid of the radiation source lies, the spherical coordinate system being the desired second coordinate system.

Figure 2:
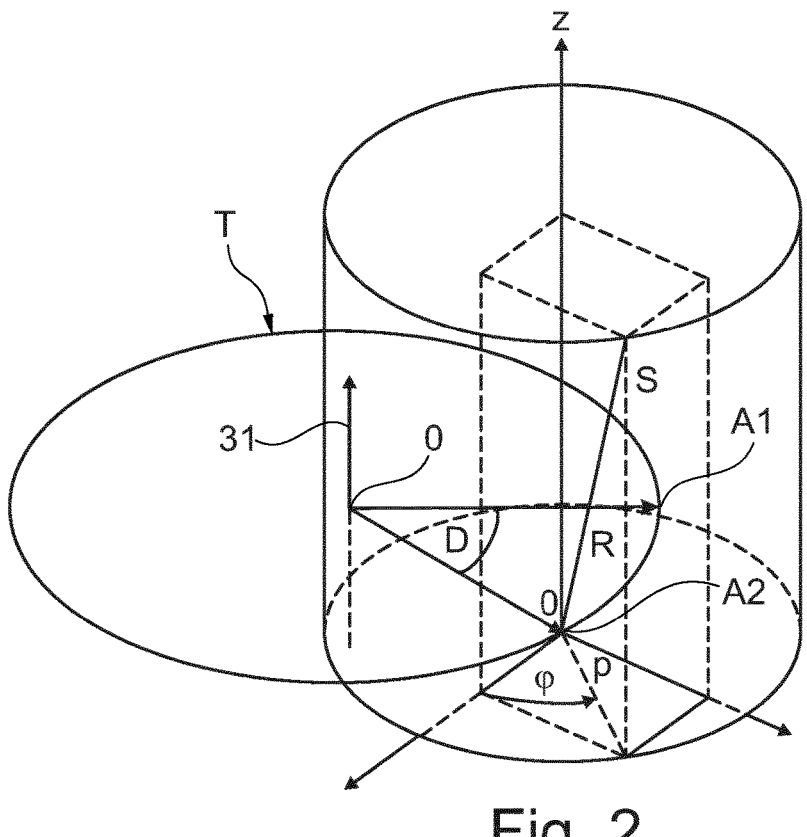
FIG. 2 schematically shows a cylindrical coordinate system, the origin of which moves on a circle arc.
Figure 5:
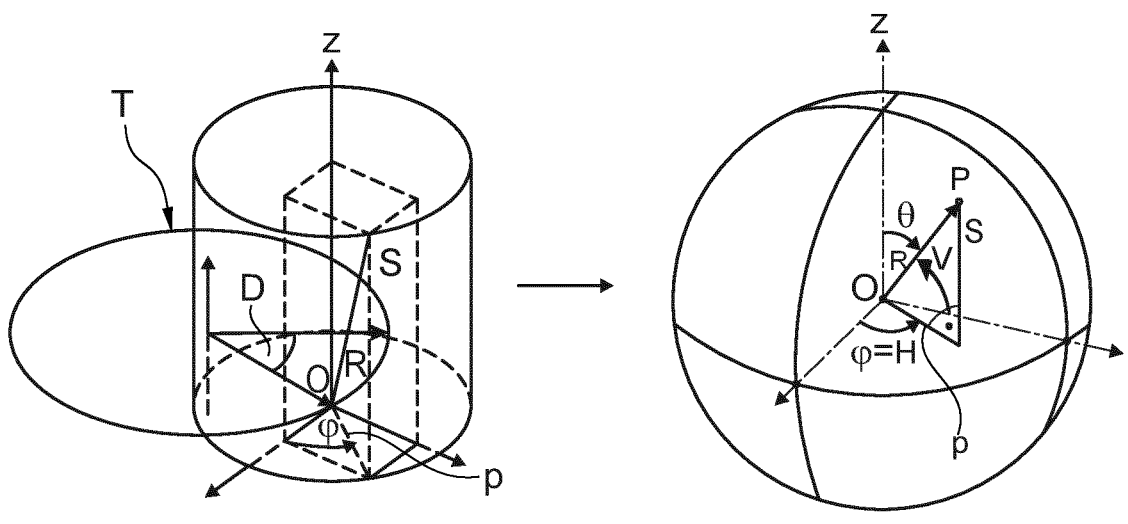
FIG. 5 schematically shows a coordinate mapping from a cylindrical coordinate system, the origin of which moves on a circle arc, onto a spherical coordinate system, the origin of which moves on a circle arc.

FIGS. 2 and 5 illustrate this procedure. FIG. 2 shows a cylindrical coordinate system, the origin of which moves on a circular arc. The trajectory of the cylindrical coordinate system moved with it is indicated by T. The trajectory D corresponds to the movement of a headlamp in question of the vehicle 1 on the turntable 3. The turntable 3, or the headlamp, is in this case rotated from an initial setting A1 through the angle D. In the representation of FIG. 2, the headlamp has been rotated into the setting A2. FIG. 2 shows the conventional parameters of a cylindrical coordinate system. The height S in this case indicates the height position of the sensor 4 according to FIG. 1. In the cylindrical coordinate system, the planar range from the headlamp to the sensor 4 is indicated by p.

It should be pointed out that the cylindrical coordinate system of FIG. 2 constitutes the aforementioned intermediate coordinate system. The measurement values are initially recorded in the first coordinate system, which passes through the origin 0 and rotates about the rotation axis 31, the first coordinate system likewise being a cylindrical coordinate system. It is now a question of converting the measurement values in a first step into the intermediate coordinate system having the parameters φ, p and S (p and S are also capable of being measured) on the basis of the rotation angle D, and calculating the parameters H and V in a second step from the parameters φ, p and S, the parameter H according to the representation on the right in FIG. 5 indicating the azimuth angle and the parameter V indicating the elevation angle (defined as 90° minus the polar angle θ) in the spherical coordinate system. The spatial distribution to be determined of the characteristic quantity to be recorded is therefore then recorded in relation to a spherical coordinate system in which the radiation centroid of the radiation source lies at the coordinate origin.

Each rotation angle D thus has an associated local cylindrical coordinate system, for which the local azimuth angle $\varphi$ is determined (=H in the system of planes A,$\alpha$), before the local elevation angle V=90°−$\theta$ in the object system of the headlamp is calculated from the height S and the local radius p, and a distance correction is subsequently carried out according to the desired characteristic quantity, for example the luminous intensity.

The gonioradiometric calculations are carried out for example by means of a calculation unit 6, represented schematically in FIG. 1, for calculating the characteristic quantity for the multiplicity of emission directions in the second coordinate system. The calculation unit 6 records the rotation angle of the turntable 3 and the height S of the sensor 4, and has knowledge of the predetermined distances in the measuring system. The measurement values measured by the sensor 4 are also sent to the calculation unit 6. At the same time, the calculation unit may provide control instructions, for example for rotating the turntable 3 through a particular angle D or for displacing the sensor 4 to a particular height S.

The calculation will be described in detail below by way of example with the aid of FIGS. 3 and 4, FIG. 4 being an enlarged representation of the left subregion of FIG. 3.

Measurement Geometry

Figure 3:
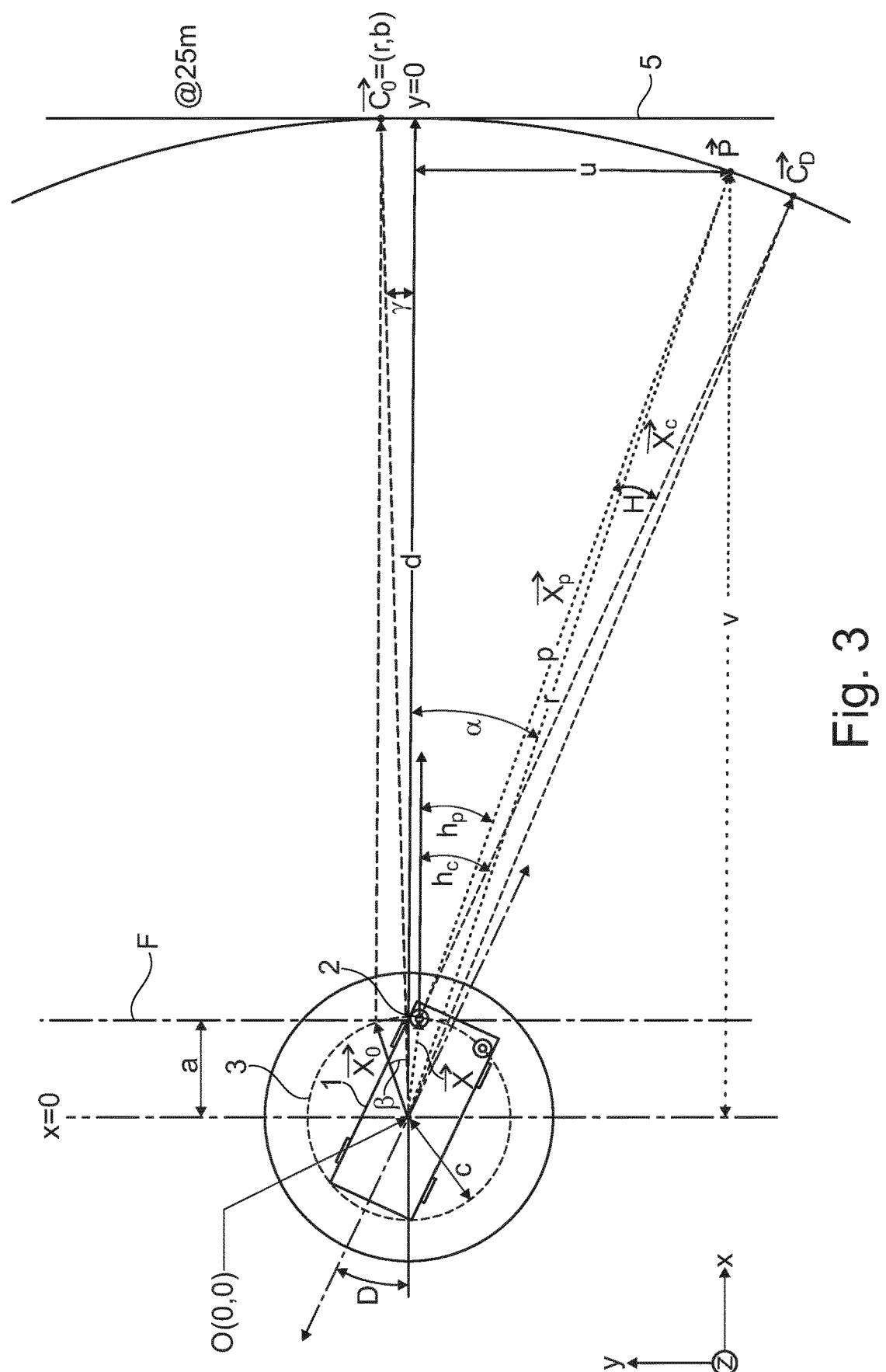
FIG. 3 schematically shows the measurement geometry for a gonioradiometer according to FIG. 1.
Figure 4:
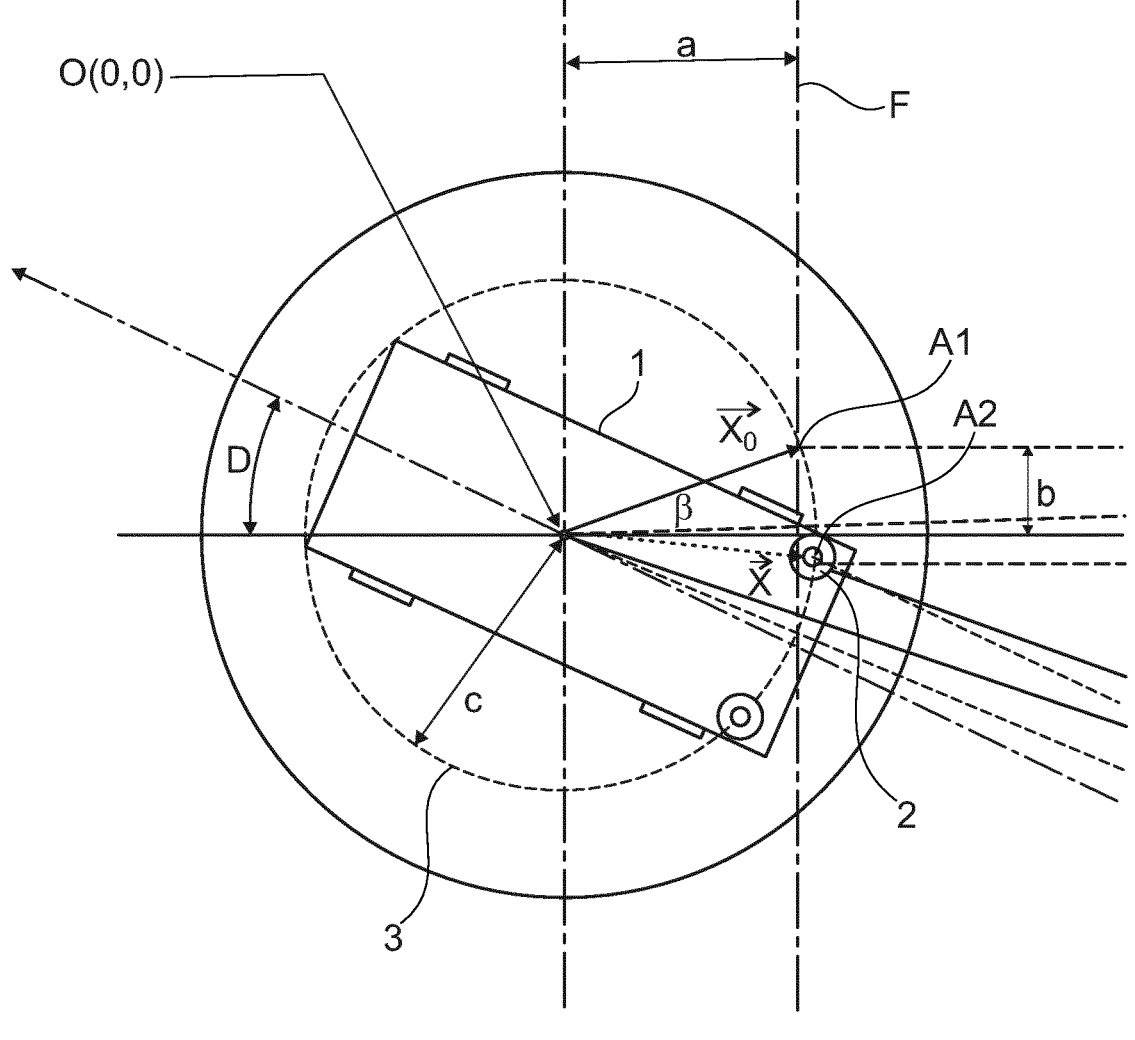
FIG. 4 schematically shows an enlarged representation of the rotary plate and of the object of the measurement geometry of FIG. 3.

The measurement geometry in FIGS. 3 and 4 is as follows. The origin O=(0,0) of the coordinate system is the point of intersection between the axis 31 of the turntable 3 and the surface 32 of the turntable 3. The angle between turntable 3 and the X axis is equal to D. The X axis points to the right toward the screen, the positive Y axis in the positive rotation sense points upward in the plane of the drawing (canonically, that is to say the light comes from left) and the Z axis points upward out of the plane of the page.

The headlamps 2 in the initial position A1 lie on a reference line F with a fixed distance a from the rotation center. Their position in space must, however, be determined during measurement operation in order to find the neutral position of the vehicle 1 therefrom. The lateral distance of the headlamps from the midplane of the vehicle 1 is b, the midplane of the vehicle 1 extending, within the manufacturing tolerances and positioning accuracy, along the X axis.

The calculation is carried out by applying 2-dimensional rotation matrices and analytical geometry in the plane. For the basic considerations, the rotation of a point P (x,y) in R$^2$ through D is required:

$$\begin{pmatrix} x \\ y \end{pmatrix} = \begin{pmatrix} \cos D & -\sin D \\ \sin D & \cos D \end{pmatrix} \cdot \begin{pmatrix} a \\ b \end{pmatrix}$$

All important points are rotated in the (x,y) plane from the neutral position and the corresponding vectors, which are suspended from the headlamp 2 as a radiation source, are subsequently calculated.

The measurement and calculation of the characteristic quantity is carried out consecutively for both headlamps of the vehicle 1, that is to say when one headlamp 2 is being measured the other headlamp is turned off or covered, and vice versa. The exemplary embodiment considers the left headlamp 2.

Calculation of H and p From D

First, the azimuth angle $\varphi$ (or H) and the local radius p in the local cylindrical coordinate system are to be determined from the rotation angle D, the local radius p being the distance between the headlamp 2 and the base point of the position of the sensor 4 in the plane in question.

The geometry is as follows:

| angle of the turntable | D | e.g. 20.00° |
|---|---|---|
| distance reference line F - rotation center (= position of headlamp) | a | is measured, e.g. 2.750 m |
| distance reference line F - screen | d | e.g. 25.000 m |
| distance rotation center O - screen | r = d + a | e.g. 27.750 m |
| lateral headlamp position | b | (is measured) |
| distance of headlamp from rotation center O | c | (c$^2$ = a$^2$ + b$^2$) |

The parameters for the active headlamp are as follows:

| coordinates of the active headlamp for H = 0 | $\vec{X}_0 = \begin{pmatrix} a \\ b \end{pmatrix}$ |
|---|---|
| angle of the vector to the headlamp against the optical axis (H = 0) (but not further required) | $\beta = \arctan\left(\dfrac{b}{a}\right)$ |
| position $\vec{X}$ of the active headlamp after rotation through D | $\vec{X} = \begin{pmatrix} x \\ y \end{pmatrix} = \begin{pmatrix} a\cos D - b\sin D \\ a\sin D + b\cos D \end{pmatrix}$ |

The parameters for the photometer position are as follows:

| lateral photometer distance to the optical axis (x), which is determined from the spatial geometry | u | |
|---|---|---|
| photometer distance from the center (y) in the XY direction | v | $v = \sqrt{r^2 - u^2}$ |
| photometer offset angle | $\alpha$ | $\alpha = \arcsin u/r$ |
| coordinates of the photometer | | $\vec{P} = \begin{pmatrix} \sqrt{r^2 - u^2} \\ u \end{pmatrix}$ |

The measurement distance is as follows:

| The vector $\vec{X_p}$ points from the active headlamp to the photometer: | $\vec{P} - \vec{X} = \vec{X_p} = \begin{pmatrix} x_p \\ y_p \end{pmatrix} = \begin{pmatrix} v - x \\ u - y \end{pmatrix}$ |
|---|---|
| The distance p to the photometer is the length of this vector and therefore the measurement range associated with D | $p = |\vec{X_p}| = \sqrt{x_p{}^2 + y_p{}^2}$ |
| The headlamp sees the photometer at the angle h$_p$ with respect to the optical axis | $h_p = \arctan\left(y_p/x_p\right)$ |

The vanishing point or the optical axis of the active headlamp is likewise rotated. In the unrotated state (D=0), the headlamp is aimed at $$\vec{C_0} = \begin{pmatrix} r \\ b \end{pmatrix}.$$

Starting from such a geometry and parameters, the azimuth angle $\varphi$ (or H) and the local radius p in the local cylindrical coordinate system may be calculated as follows.

During the rotation through D, $\vec{C_0}$ is rotated into the point $\vec{C_D}$. Computationally, this is done as for $\vec{X}_0$ by the same matrix $$\vec{C_D} = \begin{pmatrix} C_x \\ C_y \end{pmatrix} = \begin{pmatrix} \cos D & -\sin D \\ \sin D & \cos D \end{pmatrix} \begin{pmatrix} r \\ b \end{pmatrix} = \begin{pmatrix} r\cos D - b\sin D \\ r\sin D + b\cos D \end{pmatrix}$$

The vector $\vec{X_c}$ points from the active headlamp in the direction of the new vanishing point $\vec{C_D}$.

$$\vec{C_D} - \vec{X} = \vec{X_C} = \begin{pmatrix} x_c \\ y_c \end{pmatrix}$$

$\vec{X_c}$ has the angle $h_c$ in relation to the optical axis. $h_c$ is identical to D.

$$h_c = \arctan\left(\frac{y_c}{x_c}\right)$$

The angle of the headlamp in relation to the photometer is therefore $$H = h_C - h_p = D - \arctan\left(\frac{y_p}{x_p}\right)$$

$$H = D - \arctan\left(\frac{u - a\sin D - b\cos D}{v - a\cos D + b\sin D}\right)$$

H in the local cylindrical coordinate system (FIG. 2) is therefore determined.

The local radius p is equal to:

$$p =$$

$$|\vec{X_p}| = \sqrt{x_p^2 + y_p^2} \text{ or } p = \sqrt{(v - a\cos D + b\sin D)^2 + (u - a\sin D - b\cos D)^2}$$

The local radius p does not necessarily need to be calculated, since in the measurement geometry in question it coincides by definition with d and is therefore 25 m in the example in question.

In a similar way, D may conversely be determined from H. This is of practical importance, for example, when a particular angle H is intended to be approached.

In the next step, the spherical coordinates H and V in the spherical coordinate system according to FIG. 5, right image, are to be determined.

The azimuth angle H is in this case the same as in the local cylindrical coordinate system:

$$H = D - \arctan\left(\frac{u - a\sin D - b\cos D}{v - a\cos D + b\sin D}\right)$$

The angle V is obtained from the relationship between S and V by using p and D:

$$V = \arctan\frac{s}{p}, \text{ or } S = p\tan V$$

$$\text{with } p = |\vec{X_p}| = \sqrt{x_p^2 + y_p^2}$$

$$\text{or } p = \sqrt{(v - a\cos D + b\sin D)^2 + (u - a\sin D - b\cos D)^2}$$

If D and S are given, V may thus be determined relatively easily.

Lastly, the radius R in the spherical coordinate system may also be calculated for example from V and S:

$$R = \frac{S}{\cos(90° - V)}.$$

The spatial distribution of the characteristic quantity to be measured, for example the luminous intensity, may therefore be specified in the spherical coordinate system in which the radiation centroid of the radiation source lies at the center. A distance correction may additionally be carried out. A more in-depth analysis of the equations shows that there is a bijective mapping in the definition or angle range in question.

Figure 6:
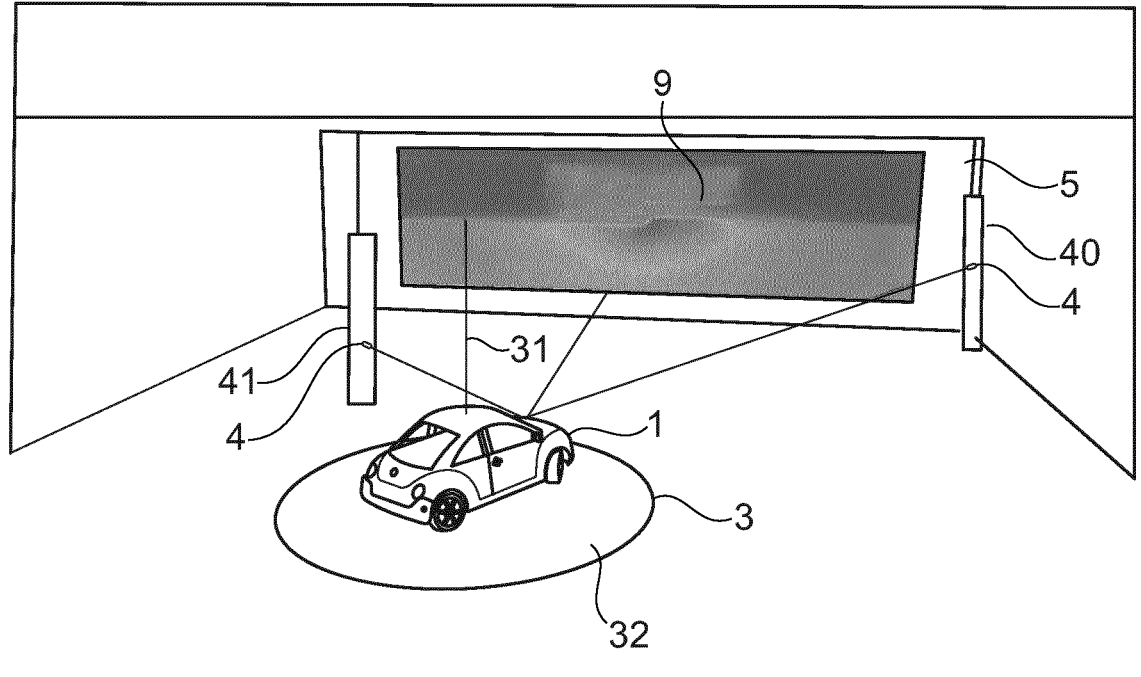
FIG. 6 shows a variant of the gonioradiometer of FIG. 1, in which two vertical masts with sensors displaceable thereon are provided at different distances from the turntable.

FIG. 6 shows another exemplary embodiment, which is based on the exemplary embodiment of FIG. 1. In this case, a second mast 41 having a second sensor 4 is provided, which is likewise displaceable in the vertical direction along the mast 41 into different height positions. The second mast 41 is in this case arranged closer than the first mast 40 to the turntable 3, for example at a range of 5 m, while the range to the first mast is 25 m. Like FIG. 1, the arrangement according to FIG. 6 comprises a calculation unit, although this is not represented separately.

Such an arrangement makes it possible to gonioradiometrically measure a plurality of radiation sources simultaneously, the sensor 4 arranged nearer being used for example to measure signal lamps, for example a turn signal light, optimally on the vehicle. For signal lamps, the far field already exists at a range of 5 m, so that larger vertical angles may be measured with the same ceiling height.

Figure 7:
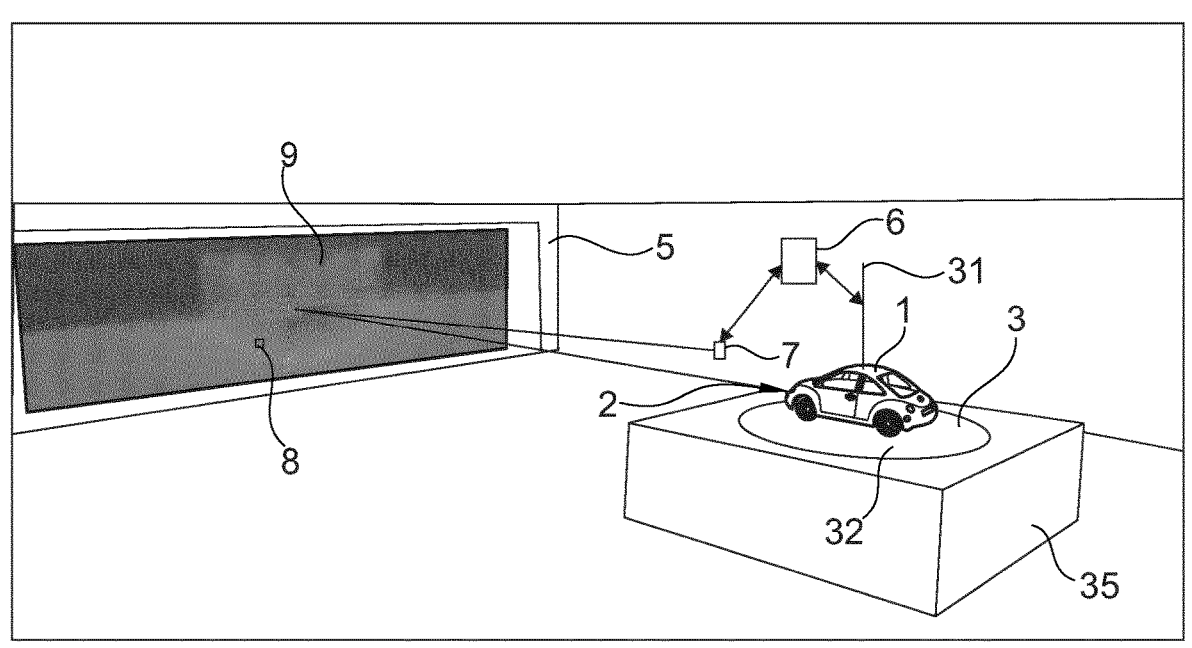
FIG. 7 shows another exemplary embodiment of a gonioradiometer, the gonioradiometer comprising a reflective measurement wall and a camera in addition to a rotating turntable.

FIG. 7 shows an exemplary embodiment in which, for a gonioradiometric measurement, a vehicle 1 arranged on the turntable 3 is rotated into at least two rotational positions and the light reflected on the measurement wall 5 is recorded by a statically arranged camera 7 represented schematically.

The camera 7 in this case comprises a 2-dimensional sensor chip, in which case the pixels of the sensor chip may be regarded as sensors in the context of the present invention. Each pixel of the 2-dimensional sensor chip is in this case assigned a wall element of the measurement wall 5. The sensor chip is, for example, a 2-dimensional CCD sensor or CMOS sensor. The camera 7 has optics which direct the incident light onto the sensor chip.

The measurement wall 5 is configured in such a way that it scatteringly reflects the incident radiation uniformly in all directions with diffuse, nondirectional reflection. It is, in particular, gray or white in order to minimize spectral influences of the reflection. The measurement wall 5 therefore does not constitute a mirror which has directional reflection satisfying the law of reflection.

The camera 7 is arranged and configured in such a way that it records light reflected at the measurement wall 5, the reflected light being imaged onto the sensor chip of the camera 7. The reflected light is recorded by the camera 7 as a luminance distribution on the measurement wall 5 for at least two settings of the turntable 3. An assigned calculation unit 6 (only schematically represented) is configured to convert the distribution of the luminous intensity, recorded by the camera 7, into a luminance distribution in the second coordinate system with the aid of a coordinate transformation.

The calculation unit 6 in this case performs the gonioradiometric calculations. It records the rotation angle D of the turntable 3 and the measurement data of the camera 7. At the same time, the calculation unit may provide control instructions, for example for rotating the turntable 3 through a particular angle.

The radiation source 2 generates a light distribution 9 on the measurement wall 5, which in the exemplary embodiment represented corresponds to the typical light distribution of an automobile headlamp. The light distribution 9 is recorded by means of the sensor chip of the camera 7 for each pivoting movement about the axis 31. The measurement wall 5 is located in the far field of the light distribution of the radiation source installed in the vehicle. It lies, for example, at a range of 25 m from the headlamp, or the radiation source.

This exemplary embodiment is therefore distinguished in that, instead of a linearly moved photometer according to the exemplary embodiment of FIG. 1, a photometrically corrected camera-measurement wall system is used and a camera measures the reflected luminance of the luminance or illuminance due to a vehicle illumination system on a measurement wall. Only the rotational movement of the vehicle, and the camera-measurement wall measuring system with which entire angle ranges can be recorded in a single luminance image, are needed in this case. The luminance distribution measured on the wall by the camera is subsequently converted into the luminous intensity distribution of the headlamp with the aid of a coordinate transformation.

Coupled coordinate systems are also used in this case, that is to say transformation of the wall coordinates, in which the luminance camera ascertains the measurement values, into the spherical coordinates in the reference system of the headlamp varies with the rotation of the headlamp in space. If the coordinates of the headlamp are known as a function of the angle of the rotating device, it is again possible to find a bijective mapping with which the light distribution in the reference system of the test object may be calculated from the angle of the rotating device and the height of the headlamp.

A plurality of partial angle ranges may then be combined to form the overall angle distribution. The advantage of such a method is that the data are obtained more rapidly with a combination of vehicle rotation and camera measurement than would be possible with the sequential grid measurement based on a photometer.

The dynamic range of the measurement with indirect measurement by means of a camera 7 is, however, smaller in comparison with a direct measurement by photometers. This is associated with the fact that the scattered light suppression both in the measurement space and in the objective when using a camera 7 is limited. A contrast of more than 100:1 can therefore be achieved only with great outlay. Taking this into account, provision may be made to remeasure distinctive points of the light distribution with a rigidly fitted sensor 8 having a higher dynamic range. Such a further sensor 8 is schematically represented in FIG. 7. According to one alternative embodiment, for this purpose an opening (not represented) is formed in the measurement wall 5, for example on the optical axis of the radiation source, through which light emitted by the radiation source passes and is detected by the additional sensor. The additional sensor is in this case located on the axis, either behind the measurement wall 5 or in the opening. In the ideal case, the sensor surface is a part of the measurement wall and has a similar reflection or scattering behavior in relation to the incident light. Alternatively, such a sensor 8 is arranged in front of or next to the measurement wall 5, while being located in the far field. Provision may also be made that such a sensor 8 is displaceable and therefore may adopt a multiplicity of positions in front of the measurement wall 5.

By means of such a sensor 8, the entire range of the light distribution covered by the measurement wall may be calibrated precisely. Since the position of such an additional sensor 8 is known, the combination of the measurement wall 5 and camera 7 merely needs to be used for the angle determination of distinctive points of a light distribution. This is associated with advantages in the traceability of the measurement values, since the combination of the measurement wall 5 and camera 7 does not need to be calibrated absolutely but may be calibrated during a measurement with the photometer.

Figure 8:
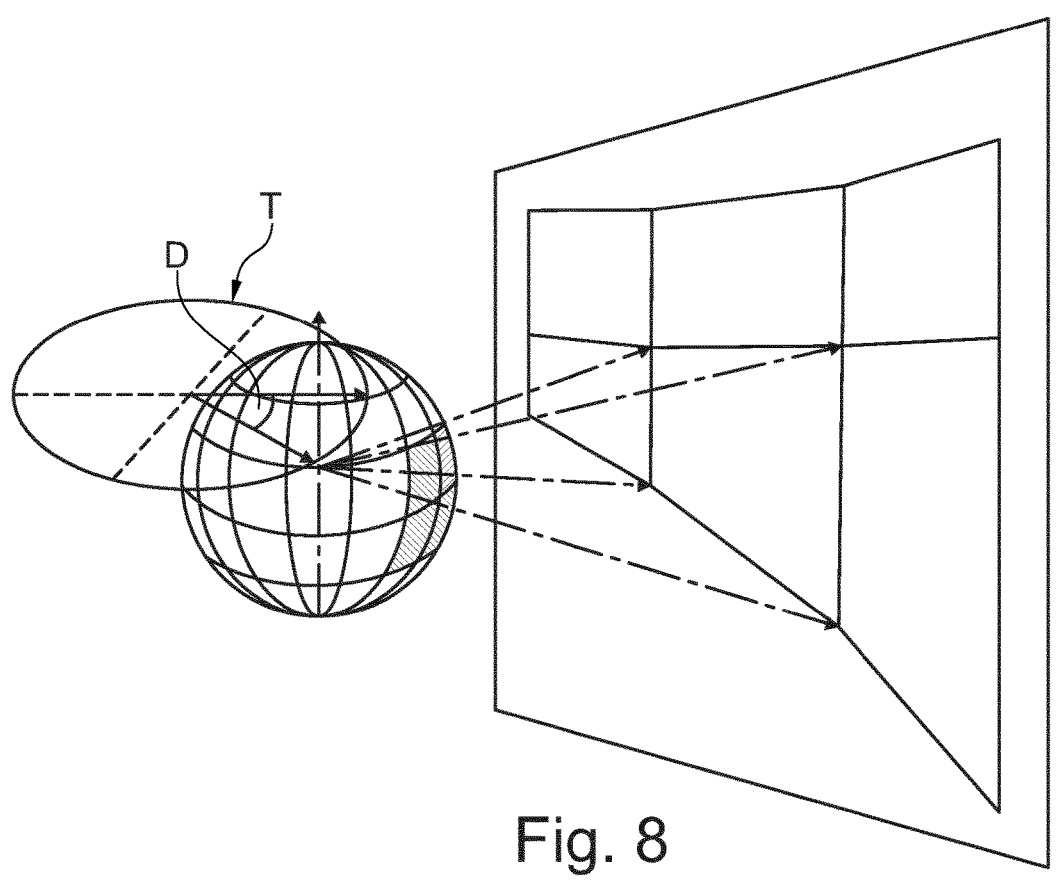
FIG. 8 schematically shows a spherical coordinate system, the origin of which moves on a circular arc and which is projected onto a projection wall.

As already mentioned, the camera 7 records the solid angle defined by the measurement wall 5 for each rotational setting of the turntable 3. By concatenation of the individual solid angles with different rotational settings of the turntable 3, the entire light distribution may be composited over a larger solid angle range in question, specifically in the coordinate system in which the radiation source or the headlamp is located at the coordinate origin. The corresponding projection is shown by FIG. 8.

According to another alternative exemplary embodiment, the turntable 3 of FIG. 1 can additionally be tilted about an axis perpendicular to the rotation axis 31, for example about the Y axis. The turntable 3 itself therefore produces a movement of the radiation source during a measurement process about a first axis 31 and about a second axis which is perpendicular to the first axis 31, in which case naturally not all spatial directions of a sphere can be gonioradiometrically recorded, but only a solid angle directed forward. This, however, is sufficient for the application of measuring the headlamp illumination.

Alternatively, the vehicle on the turntable may also be tilted about a transverse axis, for example by raising the front or the tail, so that the same effect is achieved as by tilting the turntable.

In this configuration, for the gonioradiometric measurement it is sufficient to use a static sensor which, for each combination of rotation angle and inclination angle, acquires a measurement value of the emitted radiation which is the same as the characteristic quantity to be determined, or from which the characteristic quantity to be determined is derived. The use of a static sensor is advantageous particularly when the ceiling height is limited.

Provision may be made that the inclination of the bodywork, which corresponds to the inclination of the turntable, is recorded instantaneously with a separate measuring system.

Such an arrangement has the advantage that the photometer no longer needs to be displaced on a linear axis in order to adjust the height angle in the coupled cylindrical coordinate system, but instead this may now be done by inclining the vehicle forward or backward. However, the aforementioned disadvantages of a vehicle inclination on the chassis need to be recorded and corrected. This may for example be done using cameras fitted on the left and right of the vehicle, which measure marking points applied on the bodywork and therefore record the real tilt angle of the vehicle in relation to the horizontal neutral position, without chassis influences such as spring compression or air pressure of the tires being capable of vitiating the vertical angle.

The measurement is carried out as in FIG. 1 by rotating the platform 3 on which the inclined vehicle 1 is set up, so that the headlamp moves on a circle arc around the midpoint of the rotating device. Such a measurement may be repeated for different tilt angles.

Figure 9:
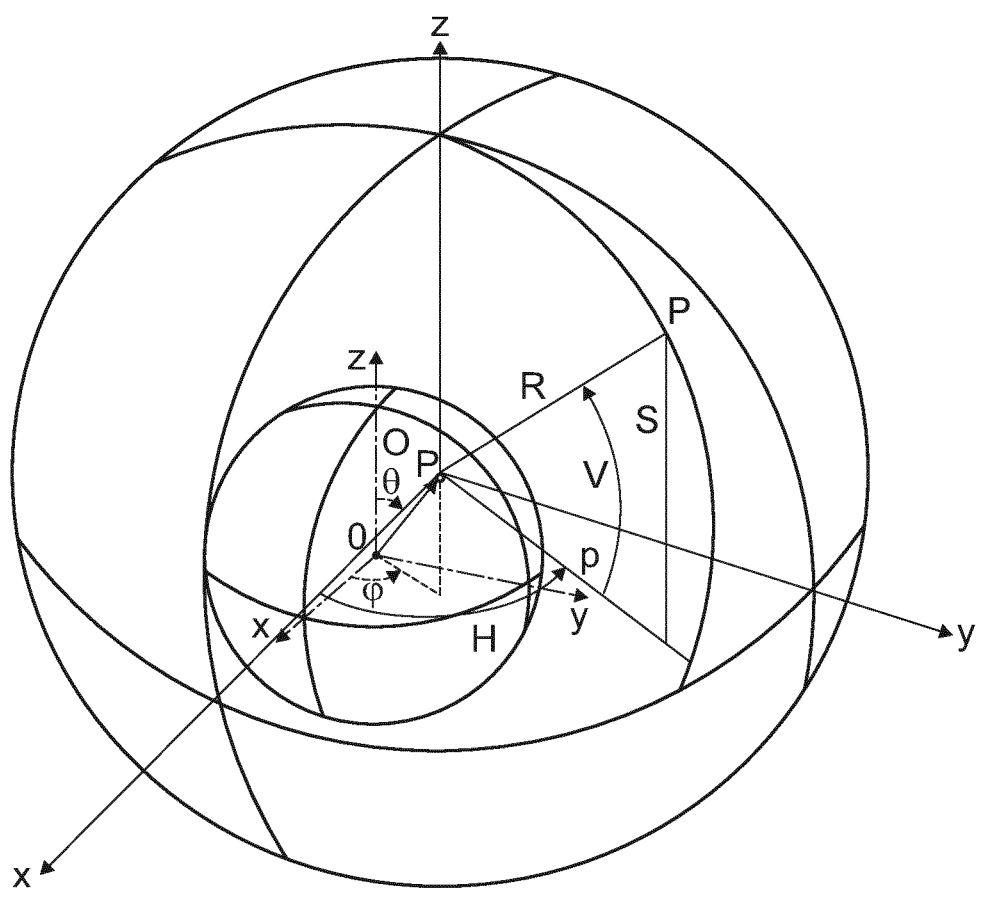
FIG. 9 schematically shows a spherical coordinate system, the origin of which moves on a spherical surface.

The measurement geometry is described in this exemplary embodiment by a spherical coordinate system, the origin of which moves on a spherical surface. This is because the tilting of the vehicle 1 about two mutually perpendicular axes on the turntable leads to measurement values on a spherical surface corresponding to the inner spherical coordinate system of FIG. 9, which constitutes a first coordinate system. The corresponding measurement values ascertained for different emission directions then need to be converted into the coordinates of the second, outer coordinate system, in which the radiation centroid of the radiation source lies at the coordinate origin. The conversion is carried out by means of a coordinate transformation between two coupled spherical coordinate systems, the absolute value as described in the first equation additionally being modified by means of the distance law and the angle of incidence with respect to the photometer.

The described aspects of the invention make it possible to objectively assess the illumination devices of vehicles in the installed state metrologically in the laboratory. The advantage over methods which are performed outdoors and/or during driving is that the influence of the roadway (reflection, dry or wet condition) and residual brightness or atmospheric influences may be excluded. The described aspects of the invention on the other hand make it possible to position light functions which are already preassembled as large modules acentrically on a goniometer and to transform the measurement results by means of a bijective, that is to say biuniquely invertible, mapping into the reference system of the equipment under test.

Aspects of the invention with an acentrically arranged radiation source (which provides the light function to be evaluated) make it possible to record the characteristic quantity to be determined in a coordinate system in which the radiation centroid of the radiation source is located at the coordinate origin, even though the radiation source is arranged acentrically. One advantage is that the radiation source to be tested does not have to be shifted to the coordinate origin of the goniometer by repositioning the vehicle. On the one hand this gives a space advantage, and on the other hand it ensures that the vehicle to be tested is located at a defined place or, if the rotary table is additionally combined with a roller test rig, is in a defined driving state.

It should be pointed out that the described transformation of the coordinate systems with an acentrically arranged radiation source may in principle be carried out for any gonioradiometric measurement, even for measuring arrangements in which a turntable according to FIG. 1 is not used and for which a module with a radiation source arranged acentrically in the module is gonioradiometrically measured in another way, for example by rotating the module about two mutually perpendicular axes, for example by means of a robot.

It is to be understood that the invention is not restricted to the embodiments described above, and that various modifications and improvements may be carried out without departing from the concepts described here. It should furthermore be pointed out that any of the features described may be used separately or in combination with any other features, so long as they are not mutually exclusive. The disclosure extends to all combinations and subcombinations of one or more features which are described here, and includes these. Insofar as ranges are defined, these include all values within these ranges as well as all subranges which fall within a range.

The invention claimed is:

1. A method for direction-dependent measurement of at least one lighting or radiometric characteristic quantity of an optical radiation source installed in an object, wherein the method comprises:

arranging an object on a turntable which comprises a rotation axis and a surface, the rotation axis of the turntable defining a first coordinate system having an origin and a spatial axis, wherein the origin of the first coordinate system is formed by a point of intersection of the surface of the turntable with the rotation axis, and wherein the spatial axis of the first coordinate system coincides with the rotation axis, wherein the object is arranged on the turntable in such a way that the radiation centroid of the optical radiation source is spaced apart from the origin of the first coordinate system, determining a position of the radiation centroid of the optical radiation source relative to the origin of the first coordinate system as a relative position, performing a gonioradiometric measurement which comprises rotation of the object about an axis, wherein the gonioradiometric measurement is carried out in the first coordinate system and the object on the turntable is rotated starting from an initial position about the rotation axis of the turntable, and wherein the rotation axis of the turntable constitutes the axis of the gonioradiometric measurement, direction-dependently recording a measurement quantity of the radiation source by the gonioradiometric measurement for a multiplicity of emission directions, wherein the emission directions which are defined in the first coordinate system are respectively assigned measured values of the measurement quantity, calculating the measurement quantity for the multiplicity of emission directions in a second coordinate system, wherein the radiation centroid of the optical radiation source lies at the origin of the second coordinate system, from the direction-dependently recorded values of the measurement quantity which have been ascertained in the first coordinate system and the relative position, wherein the measurement quantity is the same as the characteristic quantity to be measured or the characteristic quantity to be measured is calculated from the measurement quantity.

2. The method as claimed in claim 1, wherein the object is an automobile or a module, the radiation source being installed in the automobile or the module and the automobile or the module being arranged on the turntable in such a way that the radiation centroid of the optical radiation source is spaced apart from the origin of the first coordinate system.

3. The method as claimed in claim 1, wherein the turntable is rotated incrementally.

4. The method as claimed in claim 1, wherein the turntable is rotated continuously.

5. The method as claimed in claim 1, wherein the geometrical centroid of a radiation beam, which passes through a closure plate that delimits the radiation source from the surroundings, is defined as the radiation centroid of the radiation source.

6. The method as claimed in claim 1, wherein the calculation of the direction-dependent measurement quantity in the second coordinate system from the direction-dependently recorded values of the measurement quantity in the first coordinate system is carried out by mapping coordinates of the values recorded in the first coordinate system onto corresponding coordinates in the second coordinate system.

7. The method as claimed in claim 1, wherein, in addition to the rotation of the object on the turntable, the gonioradiometric measurement comprises recording of the measurement quantity by a sensor along a straight line, wherein the measurement quantity is recorded as a function of a position of the sensor along the straight line.

8. The method as claimed in claim 7, wherein the sensor is displaced along the straight line and acquires measurement values of the emitted radiation for defined positions on the straight line, wherein the sensor is used for the gonioradiometric measurement.

9. The method as claimed in claim 7, wherein an illuminance is measured as the measurement quantity and a luminous intensity as the characteristic quantity to be measured of the radiation source is calculated from the illuminance with the following formula:

$$I = \frac{E \cdot d^2}{\cos H \cdot \cos V}$$

where
I is the luminous intensity,
E is the measured illuminance,
d is a distance between the optical radiation source and the sensor and
H,V are angles at which a sensor oriented rigidly parallel to an X axis has been illuminated, wherein the X axis extends in a plane perpendicular to the rotation axis such that:
H corresponds to the azimuth angle $\varphi$, and
V corresponds to 90° minus the polar angle $\theta$.

10. The method as claimed in claim 7, wherein the first coordinate system is a cylindrical coordinate system, and coordinates of the values recorded in the first coordinate system are converted in a first step to a further cylindrical coordinate system, at the origin of which the radiation centroid of the radiation source lies, and are converted in a second step to a spherical coordinate system, at the origin of which the radiation centroid of the radiation source lies, the spherical coordinate system being the second coordinate system.

11. The method as claimed in claim 10, wherein for each emission direction, an azimuth angle and an elevation angle of the position of the sensor in the second coordinate system are calculated from the rotation angle of the turntable and the height of the sensor in the first coordinate system, and the value of the measurement quantity measured by the sensor in question is assigned to an emission direction defined by the azimuth angle and the elevation angle, while being corrected by a range and an angle of incidence with respect to the sensor in order to obtain the characteristic quantity from the measurement quantity.

12. The method as claimed in claim 7, wherein the rotation axis of the turntable extends vertically, and the straight line along which the measurement quantity is recorded likewise extends vertically.

13. The method as claimed in claim 7, wherein, in addition to the rotation of the object on the turntable and in addition to the recording of the measurement quantity along the straight line as a function of the position of the sensor along the straight line, the gonioradiometric measurement comprises recording of the measurement quantity by a second sensor along a second straight line as a function of a position of the second sensor along the second straight line, the first straight line and the second straight line extending parallel and being arranged at a different distance from the origin of the first coordinate system.

14. The method as claimed in claim 1, wherein, in addition to the rotation of the object on the turntable, the gonioradiometric measurement comprises recording of the measurement quantity by a statically arranged camera, wherein radiation emitted by the radiation source is reflected at a reflective measurement wall with diffuse reflection and is recorded by the camera as a luminance distribution on the measurement wall for at least two settings of the turntable, and the luminance distribution recorded by the camera is converted with the aid of a coordinate transformation into a luminance distribution in the second coordinate system.

15. The method as claimed in claim 14, wherein the measurement wall is arranged in a far field of a light distribution of the radiation source.

16. The method as claimed in claim 14, wherein, in addition, a further sensor is illuminated directly and a signal recorded by the further sensor is used for a calibration of the camera.

17. The method as claimed in claim 1, wherein, in addition to the rotation of the object on the turntable, the gonioradiometric measurement involves tilting of the turntable or object about an axis perpendicular to the rotation axis, the object being rotated for a multiplicity of inclination angles and the measurement quantity being recorded for each combination of rotation angle and inclination angle, the measurement quantity being recorded on the basis of the gonioradiometric measurement on a spherical surface around the radiation centroid of the radiation source.

18. The method as claimed in claim 17, wherein a stationary sensor is used for the gonioradiometric measurement, wherein the stationary sensor records a measured value of radiation emitted by the radiation centroid of the radiation source for each combination of rotation angle and inclination angle.

19. The method as claimed in claim 17, wherein the calculation of the direction-dependent measurement quantity in the second coordinate system from the directiondependently recorded values of the measurement quantity in the first coordinate system is carried out by mapping coordinates of the values recorded in the first coordinate system onto corresponding coordinates in the second coordinate system, the second coordinate system being a spherical coordinate system, the origin of which moves on a spherical surface.

20. A method for direction-dependent measurement of at least one lighting or radiometric characteristic quantity of an optical radiation source installed in an object, wherein the method comprises:
    arranging an object at or on a holding element, which is intended and configured to rotate the object about a first axis and about a second axis which is perpendicular to the first axis, the object being arranged on the holding element in such a way that a radiation centroid of the optical radiation source lies outside the origin of a first coordinate system formed by the first axis and the second axis,
    determining a position of the radiation centroid of the optical radiation source relative to the origin of the first coordinate system as a relative position, performing a gonioradiometric measurement which comprises rotation of the object about the two axes, the gonioradiometric measurement being carried out in the first coordinate system, direction-dependently recording a measurement quantity of the radiation source by the gonioradiometric measurement for a multiplicity of emission directions, wherein the emission directions which are defined in the first coordinate system are respectively assigned measured values of the measurement quantity, calculating the direction-dependent measurement quantity for the multiplicity of emission directions in a second coordinate system, wherein the radiation centroid of the optical radiation source lies at the origin of the second coordinate system, from direction-dependently recorded values of the measurement quantity which have been ascertained in the first coordinate system and the relative position, wherein the measurement quantity is the same as the characteristic quantity to be measured or the characteristic quantity to be measured is calculated from the measurement quantity.

21. A gonioradiometer for direction-dependent measurement of at least one lighting or radiometric characteristic quantity of an optical radiation source installed in an object, wherein the gonioradiometer comprises:

a turntable comprising a rotation axis and a surface, the rotation axis of the turntable defining a first coordinate system having an origin and a spatial axis, wherein the origin of the first coordinate system is formed by a point of intersection of the surface of the turntable with the rotation axis, and wherein the spatial axis of the first coordinate system coincides with the rotation axis, and the turntable configured and arranged to receive an object in such a way that the radiation centroid of the optical radiation source is spaced apart from the origin of the first coordinate system, at least one sensor which is configured and intended to measure a measurement quantity of the radiation source, wherein the turntable and the at least one sensor are configured to carry out a gonioradiometric measurement, which comprises rotation of the object about the rotation axis of the turntable, in the first coordinate system, the measurement quantity being direction-dependently recorded by the gonioradiometric measurement for a multiplicity of emission directions, wherein the emission directions which are defined in the first coordinate system are respectively assigned measured values of the measurement quantity, a calculator which is intended and configured to calculate the measurement quantity for the multiplicity of emission directions in a second coordinate system, wherein the radiation centroid of the optical radiation source lies at the origin of the second coordinate system, from the position of the radiation centroid of the optical radiation source relative to the origin of the first coordinate system and from the direction-dependently recorded values of the measurement quantity which have been ascertained in the first coordinate system, the calculator furthermore being intended and configured to calculate the characteristic quantity to be measured from the measurement quantity, if the measurement quantity is not already the characteristic quantity to be measured.

22. The gonioradiometer as claimed in claim 21, wherein the gonioradiometer forms a type 3 gonioradiometer, the at least one sensor recording the measurement quantity along a straight line as a function of a height position along the straight line.

23. The gonioradiometer as claimed in claim 21, wherein the gonioradiometer further comprises:

a reflective measurement wall with diffuse reflection, which reflects light emitted by the radiation source, a camera arranged statically and immovably and having a 2-dimensional sensor chip, pixels of the sensor chip forming the at least one sensor, wherein the camera is arranged and configured in such a way that it records light reflected at the measurement wall for at least two settings of the turntable, the reflected light being imaged onto the sensor chip of the camera and the reflected light being recorded by the camera as a luminance distribution on the measurement wall, wherein the calculator is configured to convert the luminance distribution, recorded by the camera, into a luminance distribution in the second coordinate system by a coordinate transformation.

24. The gonioradiometer as claimed in claim 21, wherein the at least one sensor comprises a static sensor, in addition to rotation about the rotation axis, the turntable is configured to tilt the object arranged on it about an axis perpendicular to the rotation axis, or the object is arranged tiltably about an axis perpendicular to the rotation, wherein the turntable, or the object, and the at least one sensor cooperate during a gonioradiometric measurement in such a way that the object is rotated during a gonioradiometric measurement for a multiplicity of inclination angles and the static sensor records the measurement quantity for each combination of rotation angle and inclination angle.

* * * * *